United States Patent
Lee et al.

(10) Patent No.: US 9,141,273 B2
(45) Date of Patent: Sep. 22, 2015

(54) MOBILE TERMINAL AND METHOD OF CONTROLLING MOBILE TERMINAL

(75) Inventors: Choonjae Lee, Seoul (KR); Sangwoon Lee, Seoul (KR); Samsick Kim, Seoul (KR); Minjeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 496 days.

(21) Appl. No.: 13/551,322

(22) Filed: Jul. 17, 2012

(65) Prior Publication Data

US 2013/0106915 A1    May 2, 2013

(30) Foreign Application Priority Data

Oct. 28, 2011   (KR) .................. 10-2011-0111668

(51) Int. Cl.
  *G06F 3/0486*   (2013.01)
  *G06F 3/0488*   (2013.01)
(52) U.S. Cl.
  CPC .......... *G06F 3/0486* (2013.01); *G06F 3/04883* (2013.01); *G06F 2203/04803* (2013.01)
(58) Field of Classification Search
  CPC ............. G06T 2200/24; G06F 8/38; G06F 2203/04808
  USPC ........................................ 715/204, 763, 778
  See application file for complete search history.

(56) References Cited

U.S. PATENT DOCUMENTS

| | | | | |
|---|---|---|---|---|
| 6,295,062 | B1* | 9/2001 | Tada et al. ................... | 715/835 |
| 7,657,846 | B2* | 2/2010 | Banks et al. ................. | 715/836 |
| 8,762,886 | B2* | 6/2014 | Lietzke et al. ............... | 715/835 |
| 2003/0126137 | A1* | 7/2003 | McFadden ..................... | 707/100 |
| 2005/0093868 | A1* | 5/2005 | Hinckley ..................... | 345/502 |
| 2005/0165715 | A1* | 7/2005 | Farnham et al. ................. | 707/1 |
| 2006/0112354 | A1* | 5/2006 | Park et al. .................... | 715/835 |
| 2006/0248469 | A1* | 11/2006 | Czerwinski et al. .......... | 715/764 |
| 2007/0094611 | A1* | 4/2007 | Sasaki ......................... | 715/804 |
| 2008/0307350 | A1* | 12/2008 | Sabatelli et al. ............. | 715/779 |
| 2009/0015593 | A1* | 1/2009 | Kang et al. ................... | 345/581 |
| 2010/0095248 | A1* | 4/2010 | Karstens ....................... | 715/846 |
| 2010/0103118 | A1* | 4/2010 | Townsend et al. ............. | 345/173 |
| 2011/0029934 | A1* | 2/2011 | Locker et al. ................. | 715/863 |
| 2011/0055773 | A1* | 3/2011 | Agarawala et al. ........... | 715/863 |
| 2011/0209089 | A1* | 8/2011 | Hinckley et al. .............. | 715/810 |
| 2012/0096396 | A1* | 4/2012 | Ording et al. ................. | 715/799 |
| 2013/0055127 | A1* | 2/2013 | Saito et al. .................... | 715/769 |

OTHER PUBLICATIONS

Switch Android Home Screens via Thumbnails, Trapani, 2010.*
How to rearrange icons or move icons from one Home Screen to another on the iPad and iPhone, Abrams, 2010.*

* cited by examiner

*Primary Examiner* — Stephen R Koziol
*Assistant Examiner* — Phong Nguyen
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit configured to display a home screen including a plurality of items; and a controller configured to group the plurality of items into at least one group, select a frame for each item according to the at least one group in which the plurality of items are included, and couple and display the selected frame to each item in the at least one group.

10 Claims, 20 Drawing Sheets

(a)

(b)

(a)

(b)

(c)

(d)

(a)

(b)

(c)

MOBILE TERMINAL AND METHOD OF CONTROLLING MOBILE TERMINAL

This application claims the benefit of and priority to Korean Patent Application No. 10-2011-0111668 filed on Oct. 28, 2011, the entire contents of which are hereby incorporated by reference.

FIELD OF THE INVENTION

Embodiments of the present invention relate to a mobile terminal and a method of controlling a mobile terminal.

DESCRIPTION OF THE RELATED ART

Terminals can be divided into mobile terminals and stationary terminals. The mobile terminals can be classified as handheld terminals or vehicle mounted terminals. Nowadays, as a smart phone, a tablet personal computer (PC), etc., are widely used, various methods for efficiently managing applications installed in a terminal are provided. A user can arrange and use an item such as a shortcut icon and a widget corresponding to a frequently using function, application, etc. However, it is difficult for the user to manage the many difference icons and applications provided on the terminal.

SUMMARY OF THE INVENTION

In an aspect, a mobile terminal includes: a display module for providing a home screen in which a plurality of items are arranged; and a controller for controlling to group the plurality of items into at least one group and to couple and display a frame differently selected according to a group in which each item is included to each of the plurality of items.

In another aspect, a method of controlling a mobile terminal, the method includes: entering a home screen at which a plurality of items are arranged; and coupling and displaying a frame differently selected according to a group in which each item is included to each of the plurality of items.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
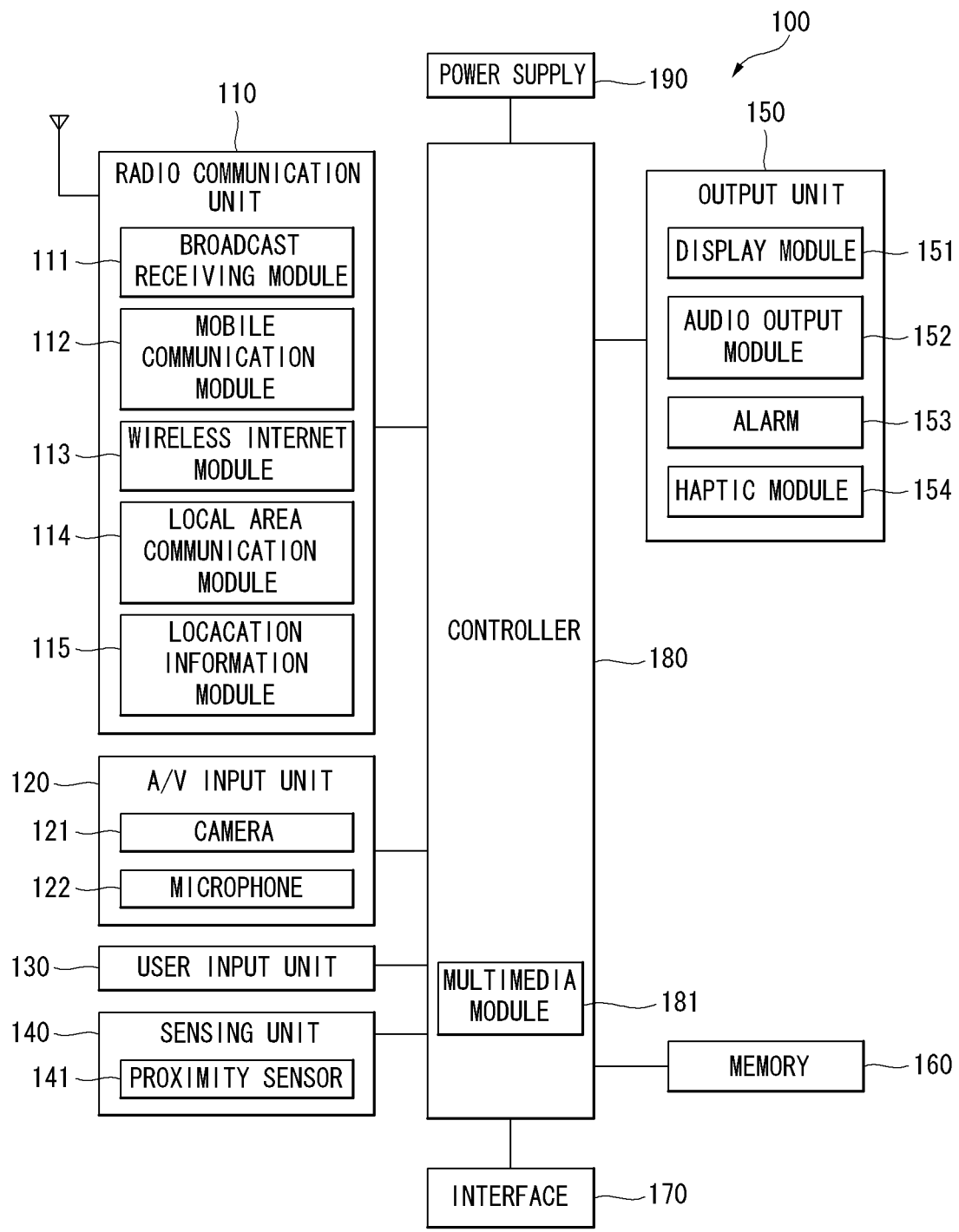
FIG. 1 is a block diagram illustrating a configuration of a mobile terminal according to embodiments of the present invention.

FIG. 1 is a block diagram of a mobile terminal 100 according to an embodiment of the present invention. It is understood that other embodiments, configurations and arrangements may also be provided. With reference to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or Zig-Bee™ may be used as a local area communication technique.

The position-location module 115 may confirm or obtain the position of the mobile terminal 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures obtained by an image sensor in a video call mode or a photographing mode. The processed image frames may be displayed on a display module 151 that may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100. For example, if the mobile terminal 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of the mobile terminal 100.

The mobile terminal 100 may also include at least two display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the mobile terminal 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be considered as a proximity sensor 141.

For the convenience of description, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the mobile terminal 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
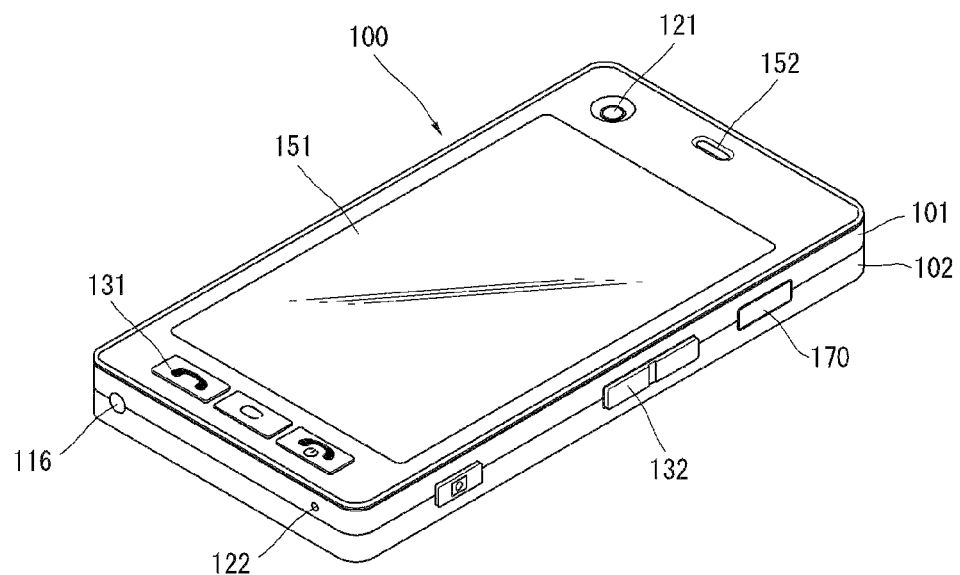
FIGS. 2 and 3 are perspective views of a mobile terminal according to embodiments of the present invention.

FIG. 2 is a front perspective view of a mobile terminal or a handheld terminal 100 according to an embodiment of the present invention. The handheld terminal 100 has a bar type terminal body. However, embodiments of the present invention are not limited to a bar type terminal and may include various types of terminals such as slide type, folder type, swing type and swivel type terminals having at least two bodies coupled such that they can move relative to each other.

The terminal body includes a case (a casing, a housing, or a cover) forming the exterior of the terminal 100. In the embodiment of FIG. 2, the case may be divided into a front case 101 and a rear case 102. Various electronic components are arranged in the space (volume) defined between the front case 101 and the rear case 102. At least one middle case may be additionally arranged between the front case 101 and the rear case 102. The cases may be made of plastics through injection molding or made of a metal material such as stainless steel (STS) or titanium (Ti).

The display module 151, the audio output module 152, the camera 121, user input unit 130 (e.g., operating units 131, 132), the microphone 122 and the interface unit 170 may be arranged in the terminal body, specifically, in the front case 101.

The display module 151 occupies a majority of the area of the main face of the front case 101. The audio output module 152 and the camera 121 are arranged in a region in proximity to an end of the display module 151, and the operating unit 131 and the microphone 122 are located in a region in proximity to the other end of the display module 151. The operating unit 132 and the interface unit 170 are arranged on the lateral sides of the front case 101 and the rear case 102.

The user input unit 130 is operated to receive commands controlling the handheld terminal 100 and may include a plurality of operating units 131 and 132. The first and second operating units 131 and 132 may be referred to as manipulating portions and may employ a tactile mechanism by which a user operates the operating units 131 and 132 by touch.

The first and second operating units 131 and 132 may receive various inputs. For example, the first operating unit 131 receives commands such as 'START,' 'END,' and 'SCROLL,' and the second operating unit 132 receives commands such as 'CONTROL' (the volume of sound output from the audio output module 152) or 'CONVERT' (a mode of the display module 151 into a touch recognition mode).

Figure 3:
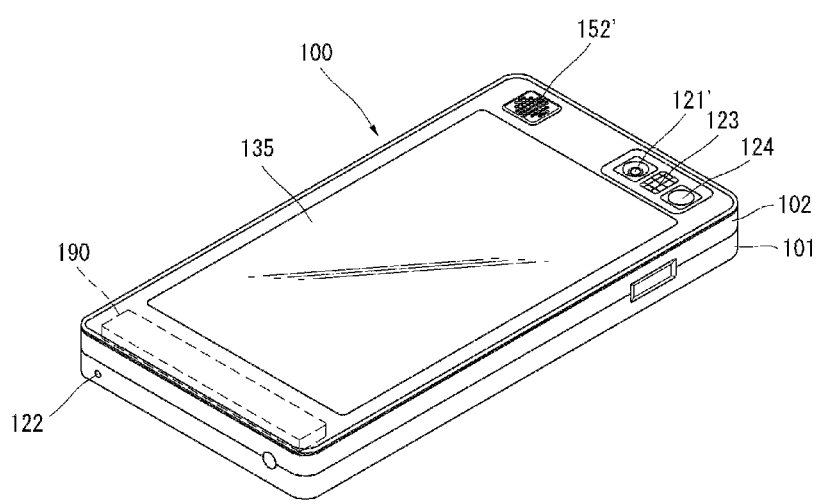

FIG. 3 is a rear perspective view of the handheld terminal shown in FIG. 2 according to an embodiment of the present invention.

Referring to FIG. 3, a camera 121' may be additionally mounted at the rear side of the terminal body, that is, the rear case 102. The camera 121' captures images along a direction opposite to that of the camera 121 shown in FIG. 2 and may have a pixel resolution different from that of the camera 121.

For example, according to one embodiment, the camera 121 has a relatively low resolution suitable for capturing an image of the face of a user and transmitting the captured image in a video call, while the camera 121' has a relatively high resolution suitable for capturing a photograph of a general subject. The cameras 121 and 121' may be mounted to the terminal body such that they may be rotated or popped-up.

A flash 123 and a mirror 124 may be additionally arranged in proximity to the camera 121'. The flash 123 lights a subject when the camera 121' takes a picture of the subject. The mirror 124 may be used by the user to view his/her face when the user wants to self-photograph himself/herself using the camera 121'.

An audio output module 152' may be additionally provided on the rear side of the terminal body. The audio output module 152' may facilitate a stereo function in conjunction with the audio output module 152 shown in FIG. 2 and may be used in a speaker phone mode when the terminal is used for a voice call.

A broadcasting signal receiving antenna 116 may be additionally attached to the side of the terminal body in addition to an antenna for voice calls. The antenna, which may constitute a part of the broadcast receiving module 111 shown in FIG. 1, may be mounted in the terminal body such that the antenna may be pulled out from (and retracted into) the terminal body.

The power supply 190 for providing power to the handheld terminal 100 is set in the terminal body. The power supply 190 may be provided in the terminal body or detachably installed on the terminal body.

A touch pad 135 for sensing a touch may be additionally attached to the rear case 102. The touch pad 135 may be of a light transmission type similar to the display module 151. In this configuration, if the display module 151 outputs visual information through both of its sides (or faces), the visual information may be viewable via the touch pad 135. The information output through both sides of the display unit 151 may be controlled by the touch pad 135. Alternatively (or in addition), a display is additionally attached to the touch pad 135 such that a touch screen may be arranged in the rear case 102.

The touch pad 135 operates in connection with the display module 151 of the front case 101. The touch pad 135 may extend parallel to the display module 151 behind the display module 151. The touch panel 135 may have a size equal to or smaller than the size of the display module 151.

Figure 4:
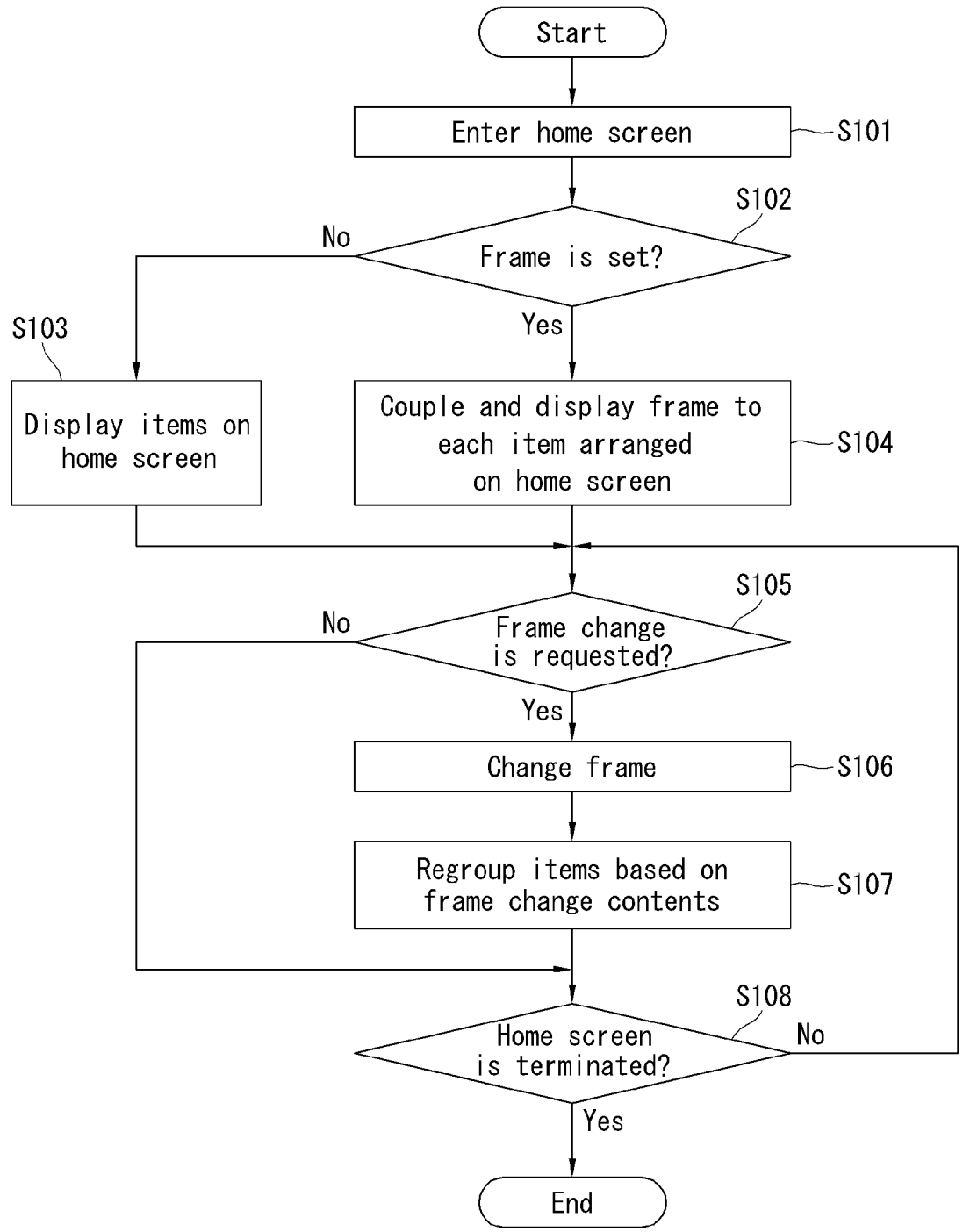
FIG. 4 is a flowchart illustrating a method of controlling a mobile terminal according to an embodiment of the present invention.

Next, FIG. 4 is a flowchart illustrating a method of controlling a mobile terminal 100 according to an embodiment of the present invention. Further, FIGS. 5 to 16 illustrate the method of controlling a mobile terminal of FIG. 4.

Referring to FIG. 4, the controller 180 enters a home screen based on a user input (S101). When entering a home screen, the controller 180 determines whether a frame is set to an item arranged at a present home screen (S102). That is, the controller 180 determines whether a setting state of a present home screen is set to couple and display a frame to an item, or is set to display an item without a frame.

If a frame is not set (No in S102), the controller 180 displays items arranged on a home screen on the home screen without a frame (S103). If a frame is set (Yes in S102), the controller 180 couples and displays a frame to each item arranged at the home screen (S104).

When a frame is set to an item displayed on the home screen, the controller 180 couples and displays the frame to the item with various methods. For example, the controller 180 may couple and display an item and a frame with a method of overlapping and displaying an item on a frame of a bottom support form.

In another example, the controller 180 may couple and display an item and a frame with a method of coupling a frame of a circumferential edge form to the outside of an area in which an item is displayed.

Figure 5:
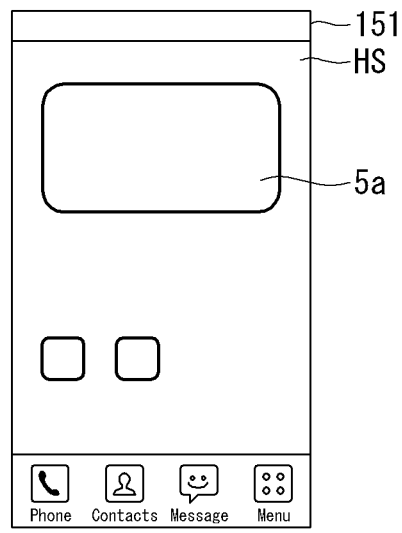
FIG. 5 illustrates an example of displaying an item on a home screen according to whether a frame is set in a mobile terminal according to an embodiment of the present invention.
Figure 5:
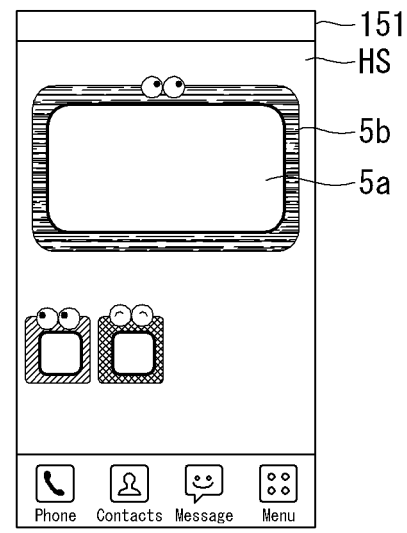

FIG. 5 illustrates an example of displaying an item on a home screen according to whether a frame is set. In particular, FIG. 5A illustrates a state in which a frame is not set, and FIG. 5B illustrates a state in which a frame is set.

Referring to FIG. 5A, when a frame is not set, the controller 180 displays only an item 5a on a home screen HS. When a frame is set by the user, i.e., when a frame display is activated, the controller 180 couples and displays a frame 5b to the item 5a on the home screen HS, as shown in FIG. 5B. According to an embodiment of the present invention, the controller 180 sets whether to activate a frame based on a user input.

Figure 6:
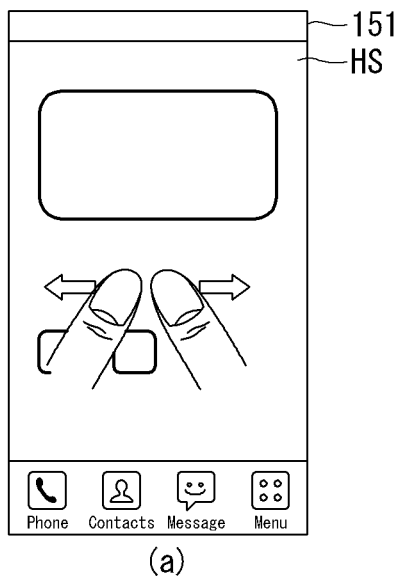
FIG. 6 illustrates an example of setting to activate a frame in a mobile terminal according to an embodiment of the present invention.
Figure 6:
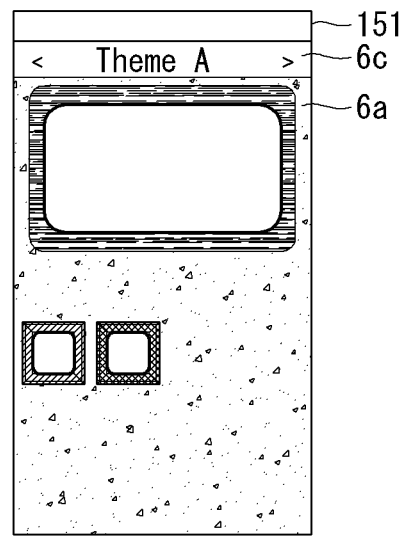
Figure 6:
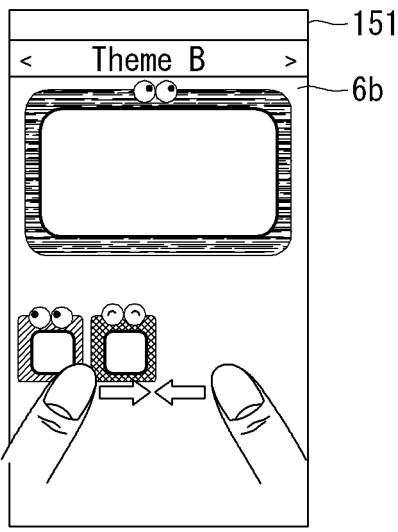
Figure 6:
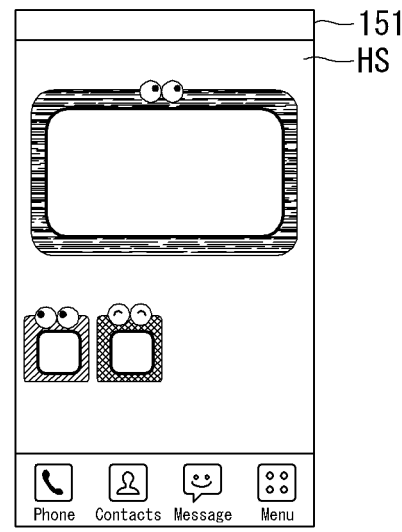

FIG. 6 illustrates an example of setting to activate a frame. Referring to FIG. 6A, in a state in which a display of a frame is inactivated, the controller 180 displays items on a home screen HS. Further, in a state in which the home screen HS is displayed, as the touch screen 151 is pinched out, the controller 180 enters a frame setting mode.

When entering a frame setting mode, the controller 180 displays a frame theme 6a that can be selected by a user on the screen, as shown in FIG. 6B. Further, when entering a frame setting mode, the controller 180 displays that the mobile terminal 100 enters a frame setting mode using a method of adjusting a display state of an item arranged on the home screen to a translucent state.

A frame theme suggested to a user in a frame setting mode may be used by reading a frame theme previously stored in the memory 160, or by downloading a frame theme from a web server. In a case of the latter, when a download of a frame theme is selected by the user, the controller 180 downloads a frame theme selected by the user from a web server connected through the wireless communication unit 110.

When a frame theme that can be selected by the user is in plural, the controller 180 may change and display a frame theme based on a user input, as shown in FIG. 6C. That is, as shown in FIG. 6B, in a state in which a frame setting screen 6a corresponding to a first frame theme is displayed, when a specific user input is received, the controller 180 displays a frame setting screen 6b corresponding to a second frame theme on the screen, as shown in FIG. 6C.

A user input for changing a frame theme may include flicking and tapping to a specific area. For example, when an area 6c in which a frame theme name is displayed in an upper end portion of the screen is flicked, the controller 180 may change a frame theme displayed on the screen. When the user selects a frame theme in which the user wants, the controller 180 returns to a home screen by pinching in the frame setting screen, as shown in FIGS. 6C and 6D.

Referring to FIG. 6C, in a state in which a second frame theme 6b is displayed, when the touch screen 151 is pinched in by the user, the controller 180 stores the second frame theme 6b while displaying on a present screen as a frame theme of a home screen. Further, the controller 180 terminates a frame setting mode and returns to the home screen HS.

Further, when the mobile terminal 100 is returned to the home screen HS, the controller 180 displays items on the home screen based on the second frame theme selected in a frame setting mode, as shown in FIG. 6D. That is, the controller 180 couples and displays frames corresponding to the second frame theme to items displayed on the home screen.

Next, FIG. 6 illustrates a case of entering a frame setting mode through a pinch-out/pinch-in input or a case of terminating a frame setting mode, but the present invention is not limited thereto. According to the present invention, the controller 180 can control to enter or to terminate a frame setting mode on a home screen by various user inputs.

Referring again to FIG. 4, when coupling and displaying a frame to an item arranged on the home screen (S104), the controller 180 may differently select a frame coupled to an item according to a group in which each item is included. Further, for an item that is not grouped, the controller 180 may select a frame coupled to the item based on a function/application corresponding to the item and a category in which the item is included, or may select a frame randomly coupled to the item.

Figure 7:
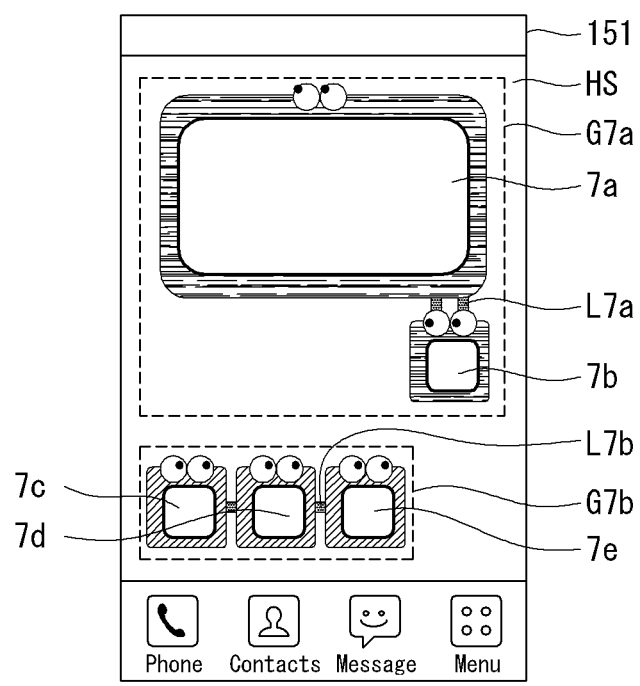
FIG. 7 illustrates an example of coupling and displaying a frame to an item arranged on a home screen in a mobile terminal according to an embodiment of the present invention.

FIG. 7 illustrates an example of coupling and displaying a frame to an item arranged on a home screen. Referring to FIG. 7, when entering a home screen state, the controller 180 displays items on the home screen HS. Further, because a present home screen state is a frame setting state, the controller 180 couples and displays a frame corresponding to each of items 7a to 7e.

Here, as shown in FIG. 7, a frame coupled to each item may be differently selected according to a group in which the corresponding item is included. Referring to FIG. 7, the controller 180 differently controls frames coupled to items 7a and 7b included in a first group G7a and a shape, a color, and a pattern of frames coupled to items 7c, 7d, and 7e included in a second group G7b.

Further, as shown in FIG. 7, the controller 180 may arrange to adjacently display items included in the same group. Referring to FIG. 7, the controller 180 adjacently arranges items 7a and 7b included in the first group G7a and adjacently arranges items 7c, 7d, and 7e included in the second group G7a.

Further, as shown in FIG. 7, the controller 180 may embody a visual effect in which frames of an item included in the same group are connected by a link. Referring to FIG. 7, the controller 180 displays a first link L7a to embody a visual effect of a connection between frames coupled to the items 7a and 7b of the first group G7a. Further, in order to embody a visual effect of a connection between frames coupled to the items 7c, 7d, and 7e of the second group G7b, the controller 180 displays the second link L7b.

FIG. 7 illustrates an example of displaying a link for representing a connection relationship between frames, and the present invention is not limited thereto. According to the present invention, in order to display a connection relationship between frames, various forms of links can be used.

Referring again to FIG. 4, the controller 180 determines whether a change of a frame of at least one item displayed on the home screen is requested (S105), and if a change of a frame of at least one item displayed on the home screen is requested (Yes in S105), the controller 180 changes a frame of at least one item in which a frame change is requested based on a user input (S106).

Further, when a frame of at least one item is changed, the controller 180 regroups items arranged on the home screen based on frame change contents (S107). The controller 180 determines whether the home screen is terminated (S108) and steps S105 to S107 are repeatedly performed until the home screen is terminated by the user. At steps S105 and S106, in a state entered a frame setting mode, the controller 180 changes a frame. That is, as shown in FIG. 6, in a state entered a frame setting mode, the controller 180 may change a frame of an item.

Figure 8:
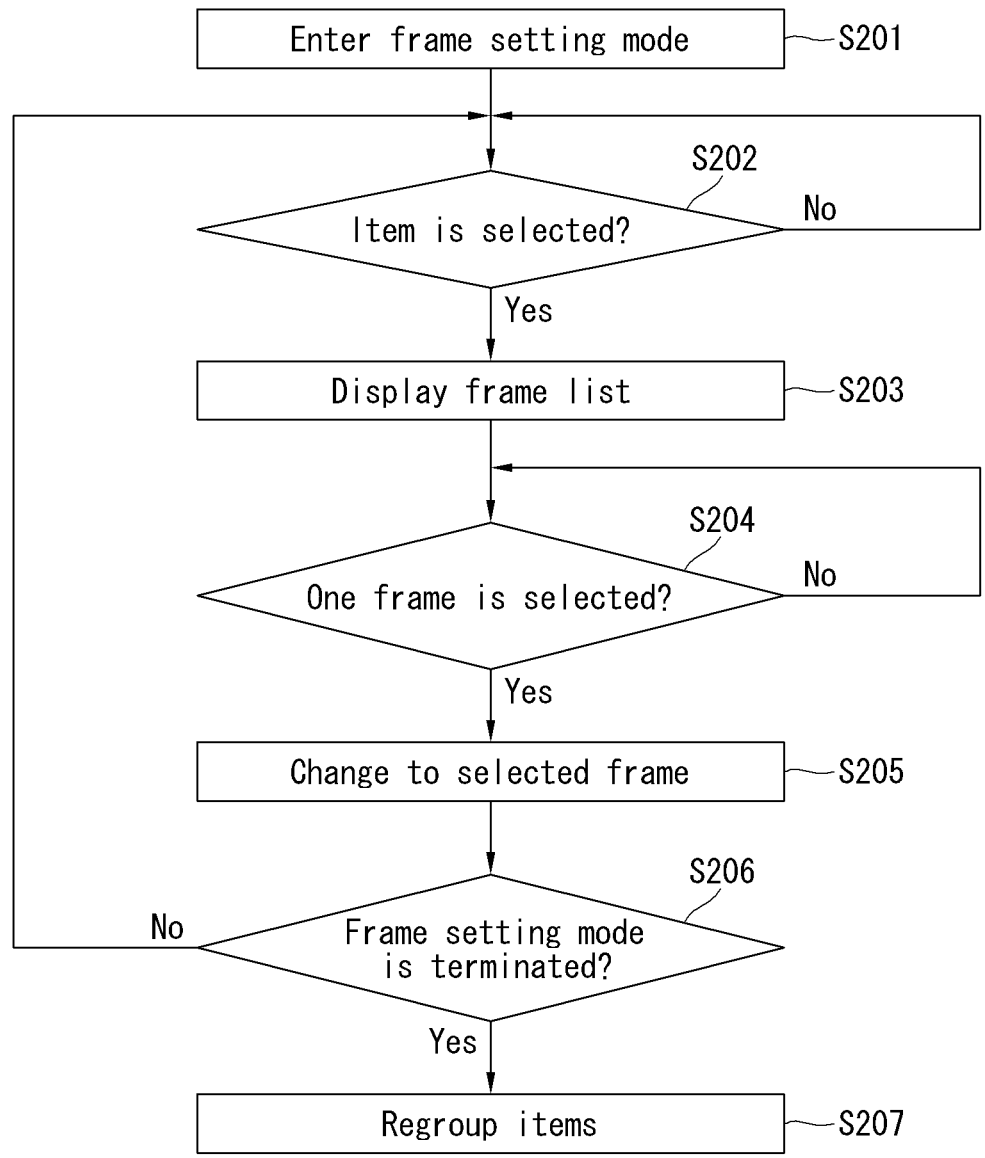
FIG. 8 is a flowchart illustrating in detail steps S105 to S107 when changing a frame by entering a frame setting mode in a mobile terminal according to an embodiment of the present invention.
Figure 9:
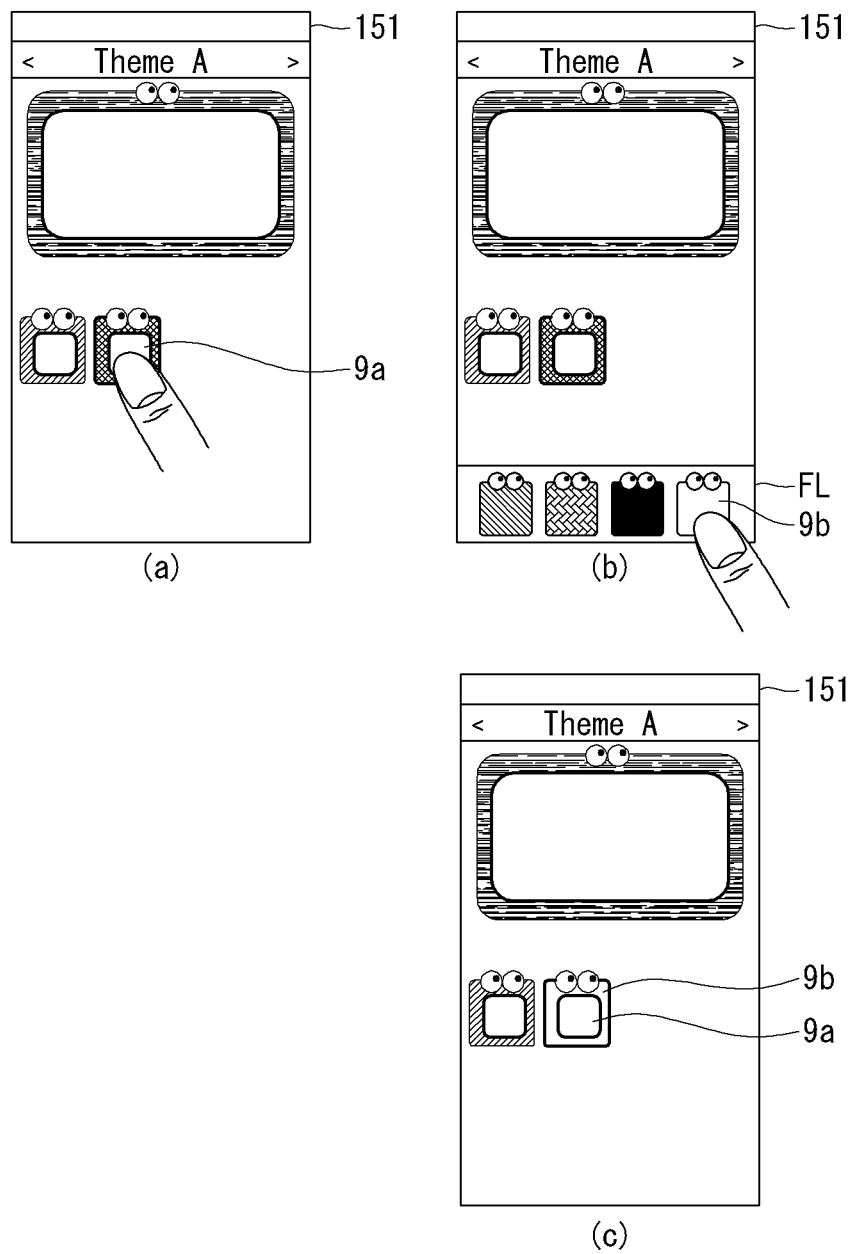
FIG. 9 illustrates an example of changing a frame in a state entered a frame setting mode in a mobile terminal according to an embodiment of the present invention.
Figure 10:
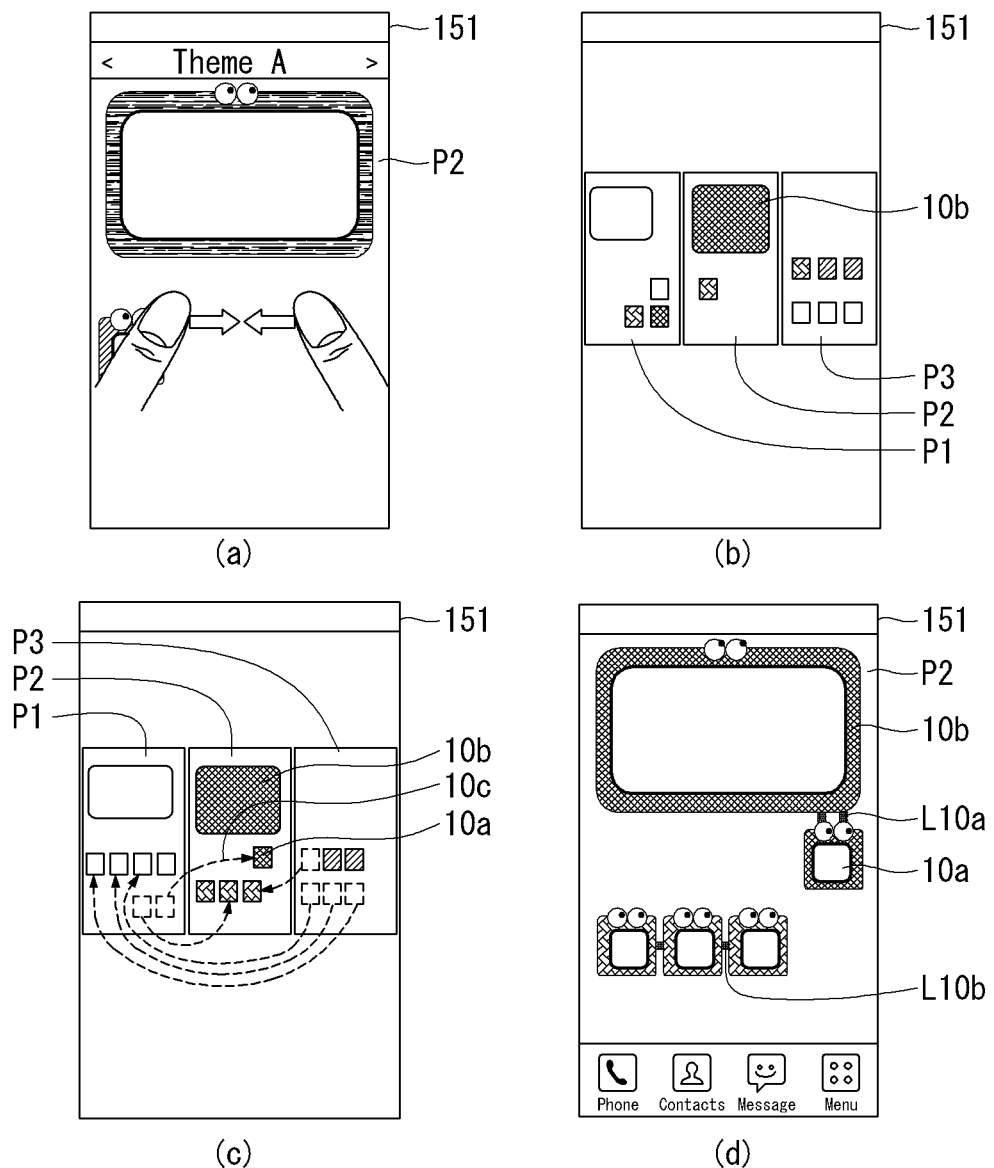
FIG. 10 illustrates an example of visualizing and displaying rearrangement of an item according to a frame change in a mobile terminal according to an embodiment of the present invention.

Next, FIG. 8 is a flowchart illustrating in detail steps S105 to S107 when changing a frame by entering a frame setting mode. Further, FIGS. 9 and 10 are diagrams illustrating in detail FIG. 8. Referring to FIG. 8, the controller 180 enters a frame setting mode based on a user input in a home screen state (S201).

Here, a user input for entering a frame setting mode in a home screen state may be input in various forms. For example, in a state entered a home screen, when the touch screen 151 is pinched out, the controller 180 enters a frame setting mode, as shown in FIG. 6A.

In a state entered into the frame setting mode, the controller 180 determines whether one item is selected by a user input (S202), and if one item is selected by a user input (Yes in S202), the controller 180 displays a list of frames that can be coupled to the selected item on a screen (S203). Here, when the number of frames that can be coupled to the selected item is larger than that of frames that can be displayed in an area in which a frame list is displayed, the controller 180 may scroll and display the frame list based on a user input. For example, when flicking to an area in which the frame list is displayed is input, the controller 180 may control to scroll and display the frame list.

The controller 180 determines whether one frame is selected from the frame list (S204), and if one frame is selected from the frame list (Yes in S204), the controller 180 changes a frame of the item selected at step S202 to a selected frame (S205). The controller 180 determines whether a frame setting mode is terminated (S206) and steps S202 to S205 is repeatedly performed until a frame setting mode is terminated by a user.

Here, a user input for terminating a frame setting mode may be input in various forms. For example, in a frame setting mode, when the touch screen 151 is pinched in, the controller 180 terminates a frame setting mode, as shown in FIG. 6C.

When a frame setting mode is terminated by the user, the controller 180 stores frame change contents in a frame setting mode at the memory 160. Further, the controller 180 regroups items arranged on a home screen based on frame change contents (S207). That is, the controller 180 performs a process of grouping items coupled to the same frame into one group based on frame change contents.

FIG. 9 illustrates an example of changing a frame in a state entered a frame setting mode. As shown in FIG. 9A, in a state entered a frame setting mode, when a specific item 9a arranged on a home screen is pressed, the controller 180 displays a list FL of frames that can be coupled to the corresponding item 9a at a lower end of a screen, as shown in FIG. 9B. Thereafter, when one frame 9b is selected from the frame list FL, the controller 180 changes a frame coupled to the selected item 9a to the selected frame 9b, as shown in FIG. 9C.

Referring again to FIG. 8, as items are regrouped, the controller 180 rearranges items to adjacently arrange items included in the same group (S207). Further, when rearranging items, the controller 180 visualizes and displays a process of rearranging items.

FIG. 10 illustrates an example of visualizing and displaying a process of rearranging an item according to a frame change. Referring to FIG. 10A, when the touch screen 151 is pinched in a frame setting mode, the controller 180 terminates a frame setting mode. Further, when a frame setting mode is terminated, the controller 180 stores frame change contents in a frame setting mode at the memory 160.

Further, the controller 180 regroups items arranged on a home screen based on frame change contents in a frame setting mode. In addition, when it is necessary to rearrange an item by regrouping of items, the controller 180 displays reduction images of each of pages P1, P2, and P3 constituting a home screen on the screen, as shown in FIG. 10B. Thereafter, the controller 180 visualizes and displays an image in which an item is rearranged by regrouping of an item for a predetermined time period using a reduction image of each of the pages P1, P2, and P3, as shown in FIG. 10C.

Referring to FIG. 10C, the controller 180 can rearrange items to adjacently arrange items included in the same group or to adjacently arrange groups included in the same category or having a high relation. For example, the controller 180 determines that the second item 10b, having the same frame as that of the first item 10a arranged at a first page P1 of a home screen, i.e., included in the same group is positioned at a second page P2. Accordingly, the controller 180 arranges the first item 10a adjacently to the second item 10b by moving the first item 10a to the second page P2. Further, in this process, the controller 180 displays a motion 10b in which the first item 10a moves from the first page P1 to the second page P2 on a screen for a predetermined time period.

When rearrangement of items is complete, the controller 180 stores an arrangement state of items at the memory 160. Further, as shown in FIG. 10D, the controller 180 controls to return to a home screen. Referring to FIG. 10D, the controller 180 adjacently arranges items included in the same group and displays to connect frames of items included in the same group by links L10a and L10b. Referring again to FIG. 4, the controller 180 may directly change a frame of an item on a home screen without entering a frame setting mode at steps S105 and S106.

Figure 11:
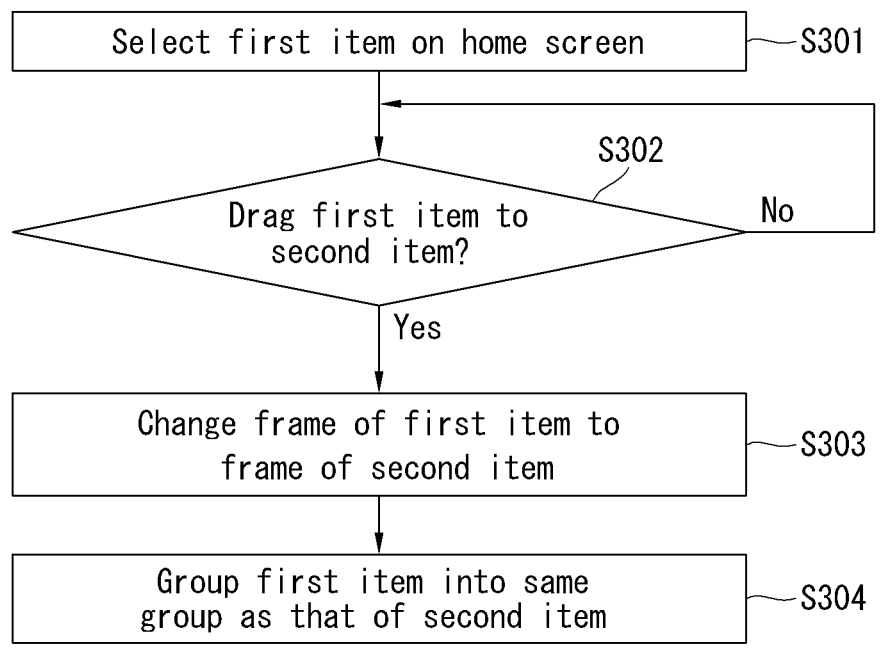
FIG. 11 is a flowchart illustrating in detail steps S105 to S107 when changing a frame on a home screen in a mobile terminal according to an embodiment of the present invention.
Figure 12:
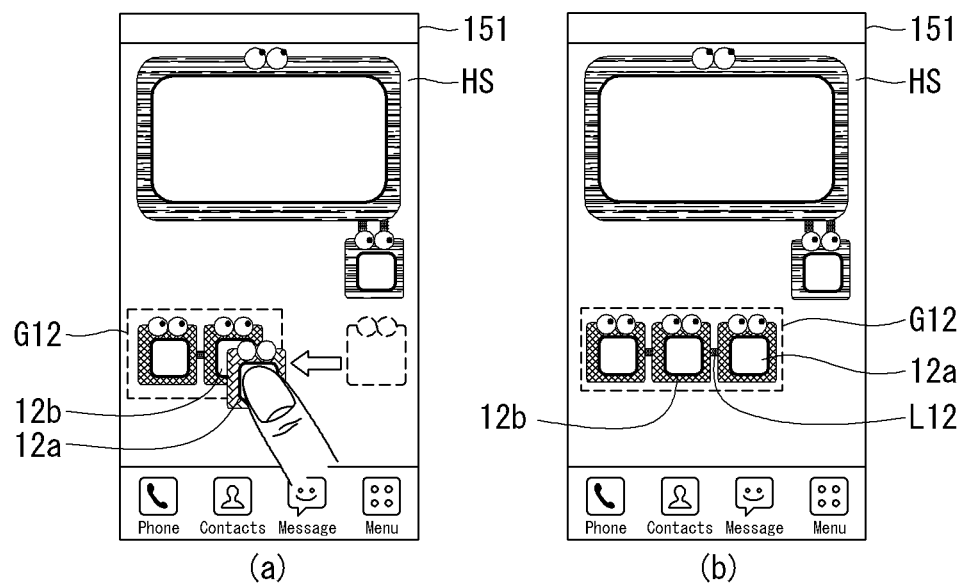
FIG. 12 illustrates an example of changing a frame of an item on a home screen in a mobile terminal according to an embodiment of the present invention.

FIG. 11 is a flowchart illustrating in detail steps S105 to S107 when changing a frame on a home screen. Further, FIG. 12 illustrates in detail FIG. 11. Referring to FIG. 11, when a first item displayed on a home screen is touched by a user, the controller 180 selects the first item (S301).

Thereafter, the controller 180 determines whether the selected first item is dragged to a second item (S302), and if the selected first item is dragged to a second item (Yes in S302), the controller 180 changes a frame of the first item to a frame of the second item (S303). Further, the controller 180 groups the first item into the same group as that of the second item (S304).

At step S304, when the second item is an item that is not yet grouped, the controller 180 groups the first item and the second item into one group. When a group including the second item already exists, the controller 180 may add the first item to a group in which the second item is included.

FIG. 12 illustrates an example of changing a frame of an item on a home screen. Referring to FIG. 12A, when a first item 12a displayed on the home screen HS is dragged to a second item 12b, the controller 180 changes a frame of the first item to a frame of the second item 12b, as shown in FIG. 12B.

Further, the controller 180 adds the first item 12a to a group G12 in which the second item 12b is included. Further, when the first item 12a is grouped into the same group as that of the second item 12b, the controller 180 rearranges the first item 12a adjacently to the second item 12b. The controller 180 displays a link L12 that connects a frame of the first item 12a and a frame of the second item 12b.

According to an embodiment of the present invention, when a new item is added on the home screen, the controller 180 may automatically set a frame coupled to the added item. For example, when an item is newly added, the controller 180 may automatically set a frame coupled to the newly added item based on an attribute of the item. Here, the attribute of the item includes a category in which the item is included and a function/application corresponding to the item.

Further, for example, when an item is newly added, the controller 180 may automatically set a frame coupled to the newly added item based on an arrangement position of the added item. In another example, when an item is newly added, the controller 180 may set a randomly selected frame as a frame of the newly added item.

Figure 13:
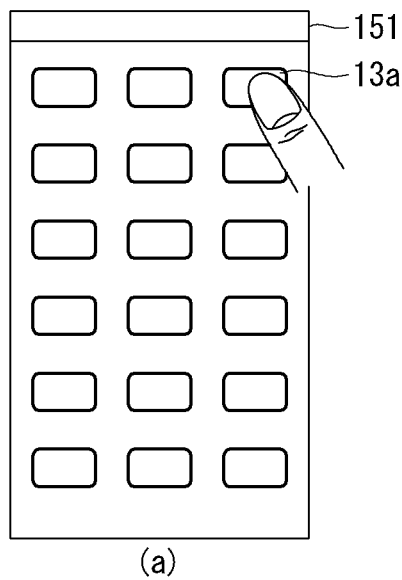
FIGS. 13 and 14 illustrate examples of setting a frame of a newly added item in a mobile terminal according to an embodiment of the present invention.
Figure 13:
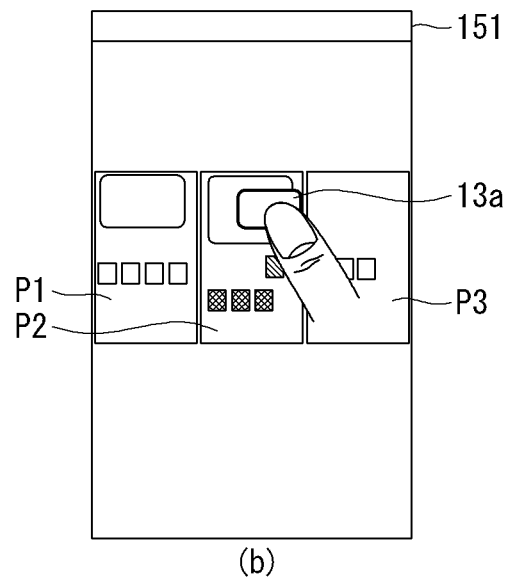
Figure 13:
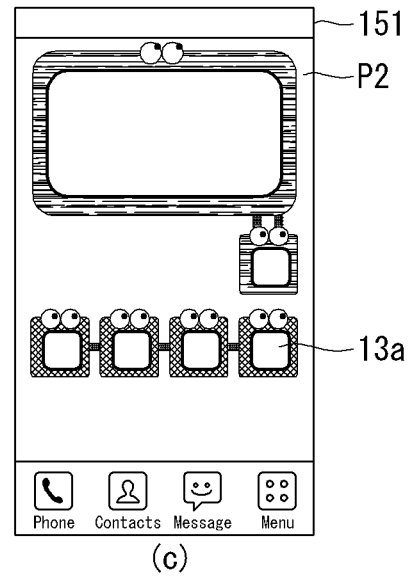
Figure 14:
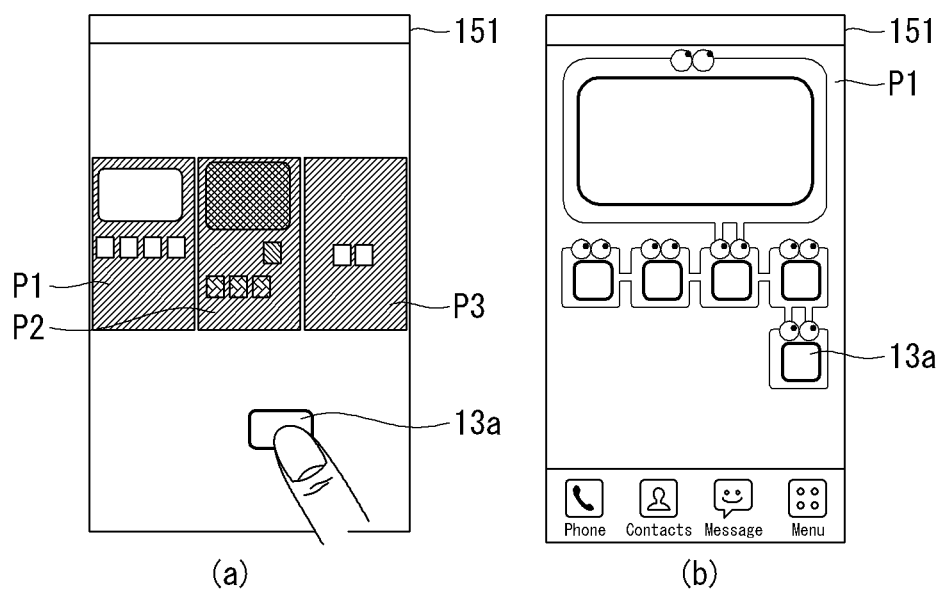

Next, FIGS. 13 and 14 illustrate examples of setting a frame of a newly added item. Referring to FIG. 13A, when a specific item 13a is pressed or touched on a menu screen, the controller 180 enters a mode of adding an item on a home screen. When entering an item addition mode, the controller 180 displays a reduction image of pages P1, P2, and P3 constituting a home screen on a screen, as shown in FIG. 13B.

Further, when the item 13a is dragged to a specific page P2 by the user, the controller 180 adds the selected item 13a to the corresponding page P2, as shown in FIG. 13C. Also, when a frame of a present home screen is activated, the controller 180 automatically sets a frame of the newly added item 13a based on a frame characteristic of the page P2 to which the selected item 13a is added. That is, the controller 180 sets a frame of items already arranged at a page P2 to which the item 13a is added as a frame of the added item 13a.

Referring to FIG. 14A, when entering an item addition mode, the controller 180 displays a reduction image of pages P1, P2, and P3 constituting a home screen on the screen. Thereafter, when the selected item 13a is dragged to another area instead of an area in which pages P1, P2, and P3 of the home screen are displayed, the controller 180 selects a page to add the item 13a based on an attribute of the selected item 13a.

That is, the controller 180 selects a page P1 in which items having an attribute similar to that of the selected item 13a are arranged as a page to add the item 13a based on a category in which the selected item 13a is included and a corresponding function/application. When a page is selected, the controller 180 adds the item 13a to the selected page P1, as shown in FIG. 14B. Further, when a frame of a home screen is in an activation state, the controller 180 automatically sets a frame of the newly added item 13a based on a frame characteristic of the page P1 in which the selected item 13a is arranged. That is, the controller 180 sets a frame of items already arranged at the page P1 to which the item 13a is added as a frame of the added item 13a.

FIG. 14 illustrates a case of selecting a page to add an item based on a characteristic of the selected item when an item is not dragged to any page, but the present invention is not limited thereto. According to the present invention, when an item is not dragged to any page, the controller 180 may select a page to arrange an item based on arrangement space of each page.

According to an embodiment of the present invention, in a state in which an item and a frame are coupled and displayed, when the item is moved by page movement, the controller 180 may provide a visual effect of a form in which the item and the frame coupled to the item move with a time gap. That is, by setting a frame to have an elastic force for an item, when the item moves, a visual effect in which the frame follows the item with a time gap by an elastic force may be provided. In this case, an elastic force between the item and the frame may be set by the user.

Figure 15:
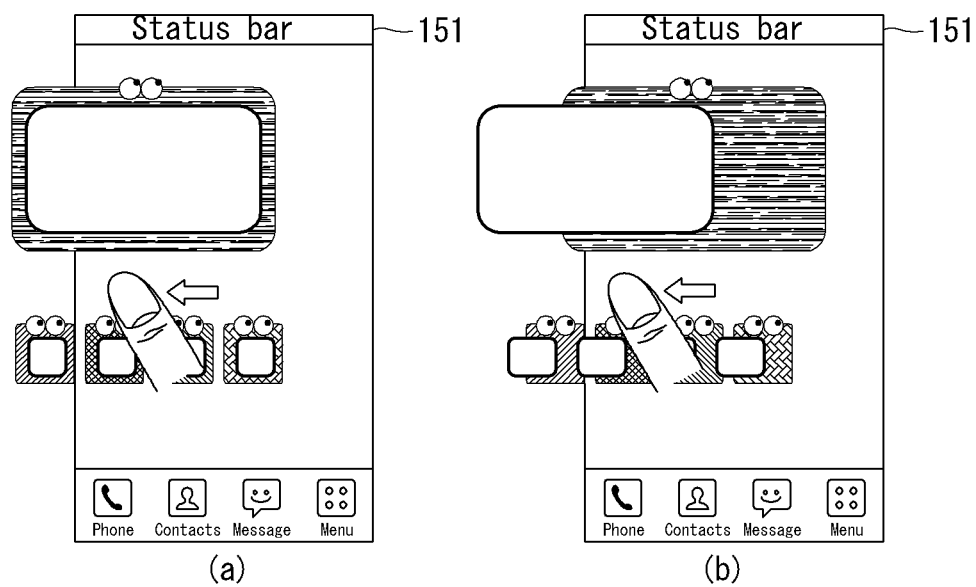
FIG. 15 illustrates an example of moving an item according to movement of a page in a mobile terminal according to an embodiment of the present invention.

FIG. 15 illustrates an example of moving an item according to movement of a page. Referring to FIG. 15A, in a state in which an elastic force between an item and a frame does not exist, when a page of a home screen is scrolled and thus the item moves, the controller 180 simultaneously moves and displays a frame coupled to the item in a state coupled to the item.

Further, referring to FIG. 15B, in a state in which an elastic force between the item and the frame exists, when a page of the home screen is scrolled and thus the item moves, the controller 180 controls movement of the item and the frame so that the frame moves along the item with a time gap corresponding to a preset elastic force.

In this instance, in a state in which the item moves to a preset distance or less, when movement of the item is terminated, the controller 180 returns and displays the item to an original position before movement of the item. Further, when the item returns, the controller 180 may visualize and display a motion that returns to an original position after the item repeats a vibration movement by an elastic force between the item and the frame.

According to an embodiment of the present invention, when moving a grouped one item, the controller 180 may move simultaneously items included within the same group.

Figure 16:
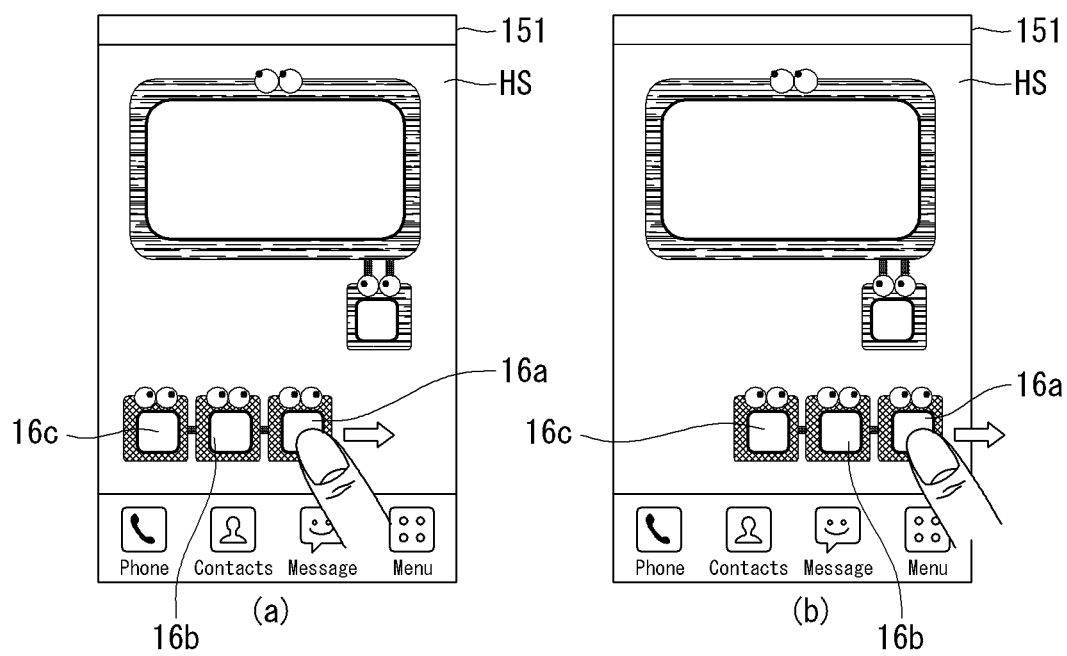
FIG. 16 illustrates an example of moving items included within the same group in a mobile terminal according to an embodiment of the present invention.

FIG. 16 illustrates an example of simultaneously moving items included within the same group. Referring to FIG. 16A, when one item 16a is selected and dragged, the controller 180 moves and displays simultaneously items 16b and 16c included within the same group as that of the corresponding item 16a in a drag direction, as shown in FIG. 16B.

FIGS. 4 to 16 illustrate where a separate frame is coupled on each item basis, but according to the present invention, the controller 180 may couple and display items included in the same group to one frame. In particular, FIGS. 17 to 20 illustrate coupling and displaying one frame on each item basis.

Figure 17:
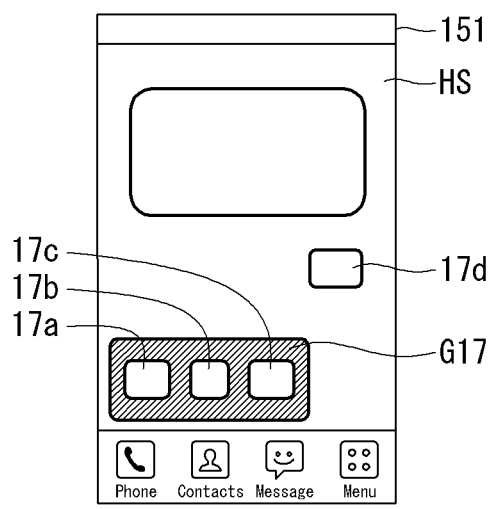
FIG. 17 illustrates an example of coupling and displaying one frame on each group basis in a mobile terminal according to an embodiment of the present invention.

FIG. 17 illustrates an example of coupling and displaying one frame on each group basis. Referring to FIG. 17, the controller 180 couples and displays items 17a, 17b, and 17c grouped into the same group G17 to one frame. Further, the controller 180 displays an item 17d that is not grouped without a frame.

When coupling and displaying one frame on each item basis, the controller 180 may add an item to a specific group by dragging an item to an area in which a frame of the specific group is displayed, or remove an item from a specific group by dragging an item to the outside of a frame display area of the specific group.

Figure 18:
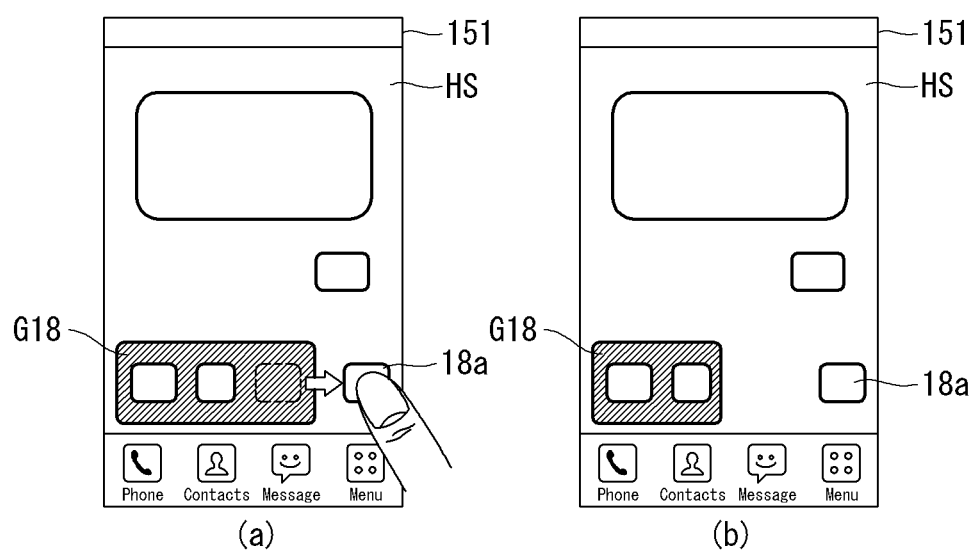
FIGS. 18 and 19 illustrate examples of adding or removing an item when coupling and displaying one frame on each group basis in a mobile terminal according to an embodiment of the present invention.
Figure 19:
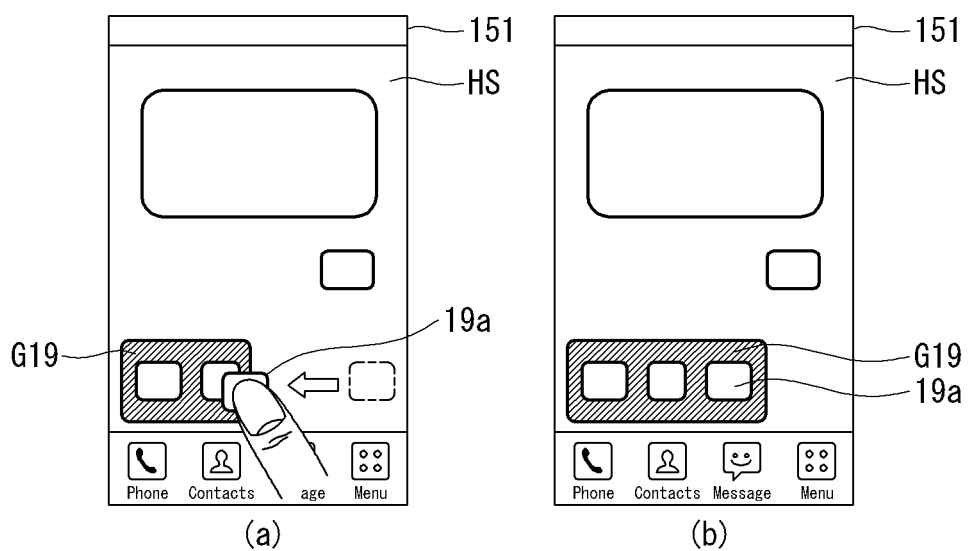

FIGS. 18 and 19 illustrate examples of adding or removing an item when coupling and displaying one frame on each group basis. Referring to FIG. 18A, the controller 180 removes a dragged item 18a from a group G18, as shown in FIG. 18B by dragging one item 18a of items grouped into the same group G18 to the outside of a frame area.

Referring to FIG. 19A, when one item 19a is dragged to an area in which a specific group G19 is displayed, the controller 180 includes the item 19a in a corresponding group G19. Further, as shown in FIG. 19B, the controller 180 couples and displays to a newly added item 19a to a frame of the corresponding group G19. Further, as described above, even when coupling and displaying one frame on each item basis, the controller 180 can simultaneously move items included in one group, as shown in FIG. 16.

Figure 20:
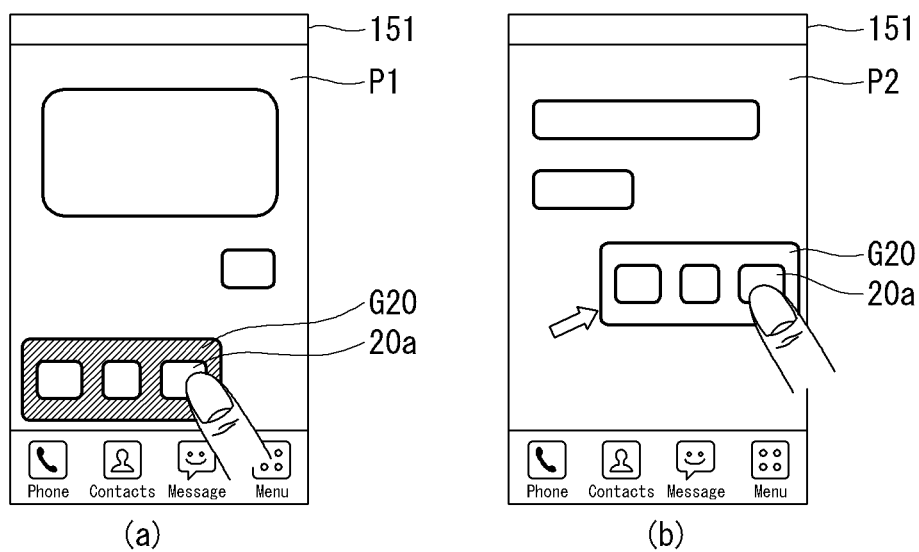
FIG. 20 illustrates an example of moving a group when coupling and displaying one frame on each group basis in a mobile terminal according to an embodiment of the present invention.

Next, FIG. 20 illustrates an example of moving a group when coupling and displaying one frame on each group basis. Referring to FIG. 20A, when a grouped one item 20a is touched, the controller 180 selects a group G20 in which the touched item 20a is included. Thereafter, in a state in which the item 20a is touched, when the item 20a is dragged from a first page P1 to a second page P2 of the home screen, the controller 180 simultaneously moves and displays items included in the same group G20 as that of the corresponding item 20a from the first page P1 to the second page P2.

According to an embodiment of the present invention, the mobile terminal 100 controls an item coupled to each item to be differently selected according to a group in which the corresponding item is included, thereby intuitively classifying items included in the same group.

Further, according to an embodiment of the present invention, when a frame is changed, the mobile terminal 100 automatically regroups and rearranges an item based on frame change contents, thereby increasing user convenience upon grouping an item. Also, the mobile terminal 100 visualizes a process of rearranging an item and provides the process to a user, thereby causing a user interest and increasing visual satisfaction of the user in the process of rearranging an item.

The disclosed methods of controlling the mobile terminal may be written as computer programs and may be implemented in digital microprocessors that execute the programs using a computer readable recording medium. The methods of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal, comprising:
   a wireless communication unit configured to wirelessly communicate with at least one other terminal;
   a display device configured to display a home screen including a plurality of items; and
   a hardware-implemented controller configured to:
   group the plurality of items into at least one group,
   select a frame for each item according to the at least one group in which the plurality of items are included,
   couple and display the selected frame to each item in the at least one group, wherein the frame for each item is separate from frames of other items in the plurality of items, and
   display one or more links for representing a connection relationship between frames associated with items in the same group,
   wherein the controller is further configured to group the plurality of items into first and second groups, to respectively select first and second different frames for the first and second groups, and to couple and display the first frames to items included in the first group and to couple and display the second frames to items included in the second group, wherein when a frame coupled to at least one of the plurality of items is changed, the controller is further configured to regroup the plurality of items based on the changed frame, wherein the controller is further configured to adjacently arrange items included in the same group in response to the regrouping of the plurality of items, wherein the controller is further configured to visually display a moving route of the rearranged items on the home screen, wherein the home screen includes a plurality of pages, and wherein the controller is further configured to;

receive a frame change input for changing a frame coupled to at least one item, and in response to receiving the frame change input, display a reduction image of each page of the home screen, and visually display the moving route of the rearranged items on the plurality of pages.

2. The mobile terminal of claim 1, wherein when a first item arranged on the home screen is touched and dragged to a second item, the controller is further configured to change a frame coupled to the first item to a frame of the second item and to group the first item and the second item into the same group.

3. The mobile terminal of claim 1, wherein when a new item is arranged on the home screen, the controller is further configured to select a frame coupled to the new item based on at least one of a position to which the new item is arranged, a function/application corresponding to the new item, and a category in which the new item is included, when entering an item addition mode of the home screen.

4. The mobile terminal of claim 3, wherein when the new item is dragged to a specific page of the home screen, the controller is further configured to select a frame coupled to the new item as a same frame of an item arranged at the specific page.

5. The mobile terminal of claim 1, wherein when at least one of the plurality of items is moved, the controller is further configured to elastically move a frame coupled to the at least one item with a time gap from moving the at least one item.

6. A method of controlling a mobile terminal, the method comprising:

allowing, via a wireless communication unit of the mobile terminal, wireless communication with at least one other terminal;

displaying, via a display device of the mobile terminal, a home screen including a plurality of items;

grouping, via a controller of the mobile terminal, the plurality of items into at least one group;

selecting, via the controller, a frame for each item according to the at least one group in which the plurality of items are included;

coupling and displaying, via the controller controlling the display device, the selected frame to each item in the at least one group, wherein the frame for each item is separate from frames of other items in the plurality of items;

displaying one or more links for representing a connection relationship between frames associated with items in the same group;

grouping the plurality of items into first and second groups;

respectively selecting first and second different frames for the first and second groups;

coupling and displaying the first frames to items included in the first group; and coupling and displaying the second frames to items included in the second group, wherein when a frame coupled to at least one of the plurality of items is changed, the method further comprises regrouping the plurality of items based on the changed frame;

adjacently arranging items included in the same group in response to the regrouping of the plurality of items;

visually displaying a moving route of the rearranged items on the home screen, wherein the home screen includes a plurality of pages;

receiving a frame change input for changing a frame couple to at least one item; and in response to receiving the frame change input, displaying a reduction image of each page of the home screen, and visually displaying the moving route of the rearranged items on the plurality of pages.

7. The method of claim 6, wherein when a first item arranged on the home screen is touched and dragged to a second item, the method further comprises changing a frame coupled to the first item to a frame of the second item and grouping the first item and the second item into the same group.

8. The method of claim 6, wherein when a new item is arranged on the home screen, the method further comprises selecting a frame coupled to the new item based on at least one of a position to which the new item is arranged, a function/application corresponding to the new item, and a category in which the new item is included, when entering an item addition mode of the home screen.

9. The method of claim 8, wherein when the new item is dragged to a specific page of the home screen, the method further comprises selecting a frame coupled to the new item as a same frame of an item arranged at the specific page.

10. The method of claim 6, wherein when at least one of the plurality of items is moved, the method further comprises elastically moving a frame coupled to the at least one item with a time gap from moving the at least one item.

* * * * *